Aug. 28, 1951 R. M. BERGSTEIN 2,565,944
FORMATION OF ARTICULATED CONTAINERS
Filed Jan. 6, 1947

INVENTOR.
ROBERT MORRIS BERGSTEIN
BY Allen & Allen
ATTORNEYS.

Patented Aug. 28, 1951

2,565,944

UNITED STATES PATENT OFFICE 2,565,944

FORMATION OF ARTICULATED CONTAINERS

Robert Morris Bergstein, Cincinnati, Ohio

Application January 6, 1947, Serial No. 720,408

5 Claims. (Cl. 93—36)

My invention relates to the use in the manufacture of containers of sheeting of such character that it cannot be scored, and is directed to the problem of producing lines of hinged articulation in the formation of such containers. The sheeting to which I refer is of the class of thermoplastic, amorphous, and usually transparent or translucent materials made in panels or sheets of substantial stiffness. These materials are usually of cellulosic or resinous origin, exemplary ones being sheets of cellulose acetate or "Lucite." ("Lucite" is a trade name of a thermoplastic resin consisting of polymerized methyl methacrylate.) Being thermoplastic, these materials can be bent or formed upon warming, but become rigid upon cooling in the formed condition.

The desirability of the use of such materials in the formation of containers for manufactured or natural products has long been realized but, until the work set forth in my copending applications Serial No. 609,091, filed August 6, 1945, now Patent No. 2,529,128 dated November 7, 1950 and Serial No. 695,143, filed September 6, 1946, now Patent No. 2,551,090 dated May 1, 1950, it was not possible to make from such materials any satisfactory containers excepting those formed under heat in a set up condition. This rendered the containers very expensive.

In the copending applications referred to above, I have taught methods of utilizing panels of sheeting along with boxboard elements in the formation of containers; and in the latter of the said applications, I have taught methods of articulating or hinging panels of sheeting together by the use of adhesively secured strips of thin and bendable films.

The fundamental object of this invention is the provision of a method of forming complete articulated structures from sheeting panels alone, i. e. without the use of bendable elements of boxboard or the like. It is an object of this invention to provide a method whereby blanks for articulated structures capable of forming complete containers may be made entirely of sheeting and film-like materials of similar character, despite the necessity for lines of articulation in a plurality of directions in such blanks.

It is an object of the invention to provide the novel structures which are the result of the method just set forth.

The teachings of this invention, therefore, are applicable to the manufacture of articulated structures formed of sheeting; which structures may be similar in all of their parts to any of the boxboard carton or container blanks or structures of commerce, or which may have special constructions deemed to be appropriate to the use of sheeting. As an exemplary disclosure of the invention, I shall describe the formation of a carton blank, and the resultant carton, of a form analogous in parts to the standard tuck-end folding carton of commerce.

It is an object of my invention to provide a method permitting the formation of articulated structures of sheeting by procedures, and utilizing devices analogous to those currently used for the formation of folding boxboard cartons and containers.

These and other objects of the invention which will be set forth hereinafter or will be apparent to one skilled in the art upon reading these specifications, I accomplish by that procedure and use of apparatus elements and in those structures of which I shall now describe the aforesaid exemplary embodiment.

Reference is made to the accompanying drawings, wherein.

Figure 4:
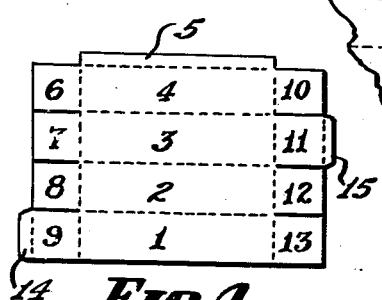
Figure 4 is a plan view of a finished carton blank.

The problem in connection with the exemplary structure is that of forming from sheeting an articulated blank or container of the tuck-end type. The exemplary sheet is a cellulose acetate of sufficient thickness to be relatively stiff, and incapable of being scored to form hinged lines of articulation. Referring to Figure 4, the completed blank has enclosing body walls 1, 2, 3, and 4 and a glue flap 5, together with closure flaps 6, 7, 8, and 9 at one end and 10, 11, 12, and 13 at the other. One of the closure flaps at each end, namely 9 and 11, is shown as carrying tuck flaps 14 or 15. These various parts must be hingedly articulated together along lines of articulation which are dotted in the figure.

Figure 1:
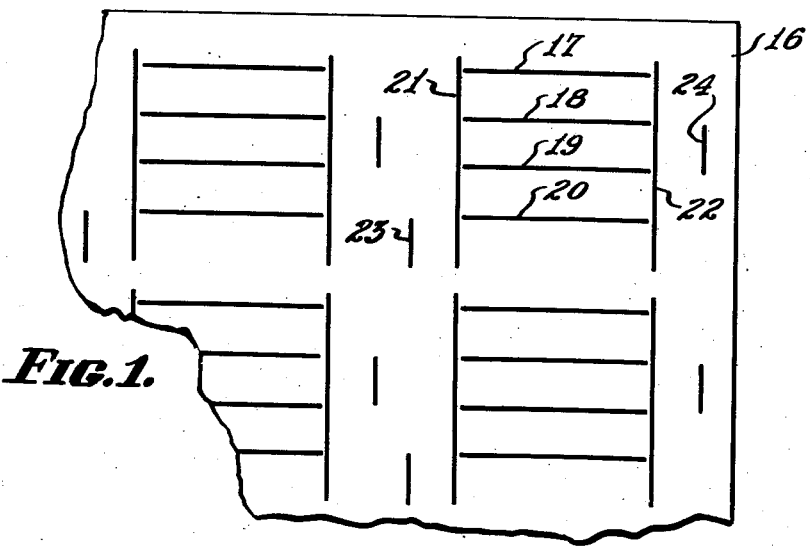
Figure 1 is a partial plan view of a sheet treated in accordance with the first step of my process.

In forming such a structure, I provide sheets of the acetate, one of which is indicated at 16 in Figure 1. These sheets may be formed by cutting from a roll of the acetate. Having determined a multiple carton layout and having determined the desired size of sheet from the layout, I next provide a die to be used in the conventional cutting and scoring press employed in boxboard carton manufacture.

The usual die for boxboard carton manufacture employs cutting rules and scoring rules which, together with suitable spacer blocks are locked into a chase or frame. In the practice of my invention, however, I do not employ scoring rules. Instead, I make up a die in which I provide cutting rules so arranged as to form lines of cut along the desired lines of articulation in the finished blanks. In the initial die, I omit cutting rules which follow the external contours of the carton blanks as well as internal lines of severance, forming only lines of cut along folding lines. The object of my procedure in connection with the initial die is to form a sheet of acetate which has been cut or slit as indicated along lines of desired articulation in the carton blanks, but in which no parts, whether of the carton blanks themselves or of scrap, have been severed from the sheet. The sheets of acetate are passed through the cutting and scoring press in the ordinary way.

Thus, in Figure 1, as to my exemplary carton blank, I form in the initial cutting operation, lines of cut 17, 18, 19, and 20 which respond to the longitudinal lines of articulation between the enclosing body walls of the desired carton. I also form cut lines 21 and 22 responding to the transverse lines of articulation by means of which the closure flaps are hinged to the body walls of the carton. If the carton has other lines of articulation, such as those by which tuck flaps are articulated to closure flaps, I form additional lines of cut as at 23 and 24.

As indicated, it is desired that the sheet hold together after this cutting operation and that no part of it be severed so as to be removable. Hence, as indicated in Figure 1, the longitudinal cut lines 17, 18, 19 and 20 are caused to terminate short of the transverse cut lines 21 and 22 leaving small areas of the acetate as connectors between adjacent body walls. Or, I may use notched cutting rules to leave small connectors wherever desired.

Figure 2:
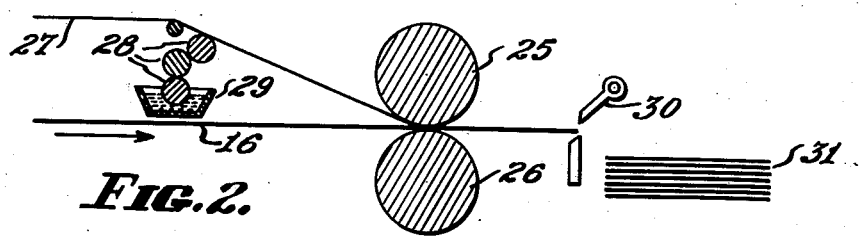
Figure 2 is a diagrammatic section of a procedure resulting in articulation.

The next procedure in my process is to cover the cut lines formed as set forth above with a film-like material of sufficient flexibility to articulate the parts together and form a bendable hinge. In Figure 2, I have shown the sheets 16 being passed through a pair of combining rolls 25 and 26 along with a very much thinner and quite flexible film 27. This film may be precoated with a pressure sensitive adhesive which will cause it to adhere all over the entire surface of the sheets 16. Or, as an incident to the laminating process, I may apply a substance to the film 27 (or to the sheets 16) as by a series of applicator rolls 28, one of which turns in a pan 29 of the substance. The substance itself may be a suitable adhesive of solven-softened or thermoplastic character, or it may consist of a solvent for the film 27 or for the sheets 16, or both. For example, I may laminate a thin acetate film 27 to a stiff acetate sheet 16 by means of a solvent such as methyl ethyl ketone. The combining rolls 25 and 26 may be heated or cooled if desired.

Individual sheets of film may be laminated to individual sheets of acetate or the like; but, if the film 27 is withdrawn from a roll or bulk supply, it will be necessary to sever it at the edges of the sheets 16, as may be done by a fly knife device 30, the laminated sheets being stacked as at 31.

As a variant of this procedure, instead of using a single film 27 of a width sufficient to cover the entire width of the sheet 16, I may employ individual, narrow bands of the film and apply these to the sheets so as to cause them to cover all of the longitudinal cut lines, such as 17 to 20. Then turning my sheets through 90°, I may pass them again through a similar mechanism and apply bands of film to the sheets in such a way as to cover the transverse cut lines, e. g. 21 to 24. Excess portions of the bands will not usually be undesirable in the blank, insofar as they are not removed by scrapping.

Figure 3:
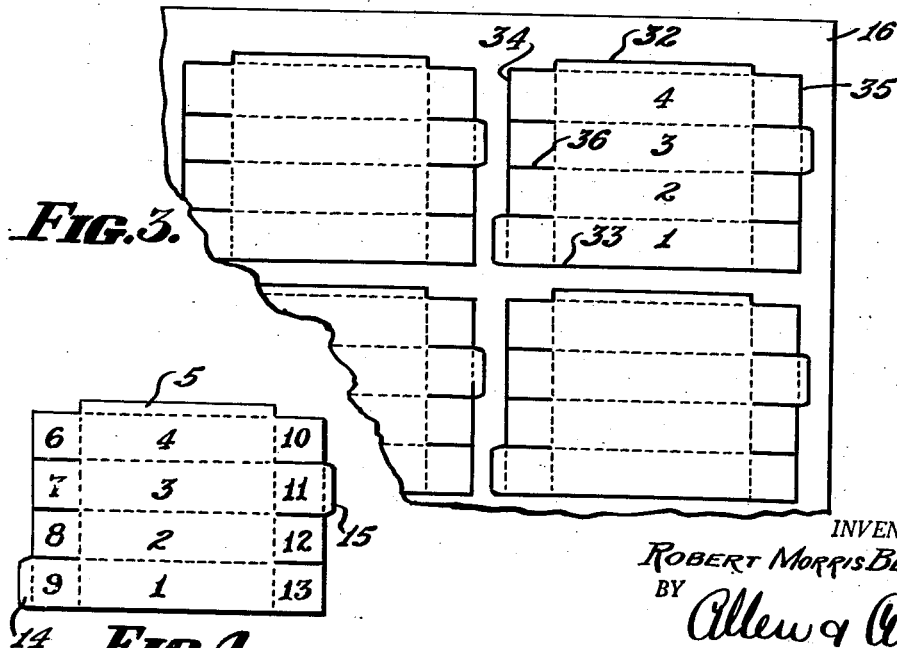
Figure 3 is a partial plan view of the sheet after the second cutting operation.

The next and final operation in the formation of my blanks is illustrated in Figure 3 and involves passing the laminated sheets through another cutting and scoring press having another die. This die again employs only cutting rules. These rules are positioned in such a way as to outline the blank and free it from the sheet, and in such a way as to sever from each other any portions of the blank which are to be unattached along contiguous edges. In Figure 3, the cut lines formed in the operation of Figure 1 are now indicated by dotted lines, since, through the laminating operation, they have now become lines of articulation. The solid lines in Figure 3 are representative of the lines of cut formed by the second die.

The distinction between the primary and secondary cutting operations in my process is that the first of these cuts the sheet on all subsequent lines of fold whereas the second cuts the sheet on all lines of ultimate severance both internal and external. The application of the hinging film substance occurs between the two operations, and hence this substance is cut along with the sheet in the second cutting operation.

Thus, it will be seen that I form a line of cut 32 freeing the glue flap from the body of the sheet and also a line of cut 33 freeing the outer edge of the opposite body wall 1. I form lines of cut 34 and 35 outlining all closure flap portions and completing the freeing of the blank from the sheet, entirely or except for such attachment as may be desired for a proper scrapping operation. I also form lines of cut such as those indicated at 36, freeing the lateral edges of the closure flaps from each other.

With a scrapping operation similar to that employed with cut and scored sheets for boxboard cartons, I remove the blanks which now are in the form illustrated in Figure 4, of the knocked down variety, these operations may be performed on the machinery current in the art for similar operations on cut and scored boxboard blanks. Thus the blank of Figure 4 may be sent through the standard carton folding and gluing machines to be tubed by folding along a pair of intermediate score lines with the adhesive attachment of the glue flap 5 to the free edge of the body wall 1. During such folding any small unsevered connectors between adjacent panels will break as will be readily understood, or the connectors may have been severed by cutting rules in the operation of Figure 3. The carton may be folded and glued in such a way that the thin film forming the hinged connection between panels will lie on the inside or outside of the line of fold, the latter being preferable since then the cut edges of the panels are not exposed.

Certain advantages flow from the use in laminating of a thin film 27 covering the entire surface of the sheet 16. It is contemplated that where the sheet 16 is translucent or transparent, the film 27 will possess these characteristics, also. Thus, the entire structure may, as desired, be transparent. Printing may be done either on the film 27 on that surface which will come against the sheet 16 or on the surface of the sheet 16 which is to be covered by the film, and in either event in the finished translucent or transparent container the printing will be enclosed or embedded, protected from external abrasion, and given a brilliance and desirable appearance.

The material of the film 27 need not be the same as that of the acetate sheet and may be chosen from among a wide variety of transparent or decorative materials. The film 27 must cover the lines of articulation since these are cut through as described above and it must be sufficiently flexible and sufficiently strong to form satisfactory hinged joints. But the material of film 27 may be opaque with portions died out to leave transparent windows in the finished carton, or a transparent film 27 may be opaqued in part by printing or otherwise, and in these ways highly decorative effects may be secured.

Modifications may be made in my invention without departing from the spirit of it. Having thus described my invention, what I claim as new and desire to secure by Letters Patent is:

1. A process of forming articulated carton bodies from non-scorable sheeting said process comprising subjecting said sheeting to a cutting press and forming therein lines of cut following lines of proposed articulation in a carton to be formed therefrom, said lines of cut being formed both longitudinally and laterally without severing the parts of said carton from said sheeting, covering said lines of cut in said sheeting by affixing to the sheeting strips of film-like substance of sufficient flexibility to serve as a hinge by first affixing said strips continuously to said sheeting in one direction, and then affixing other strips continuously to said sheeting in another direction, and thereafter subjecting said sheeting again to the action of a cutting press and forming lines of cut therein to sever therefrom a carton blank containing said lines of hinged articulation.

2. A process of producing articulated bodies from non-scorable sheet material which comprises first cutting the sheet material both longitudinally and laterally along predetermined lines of fold without severing parts therefrom, the lines of cut so formed being incomplete lengthwise whereby to leave small portions of the material to hold the parts together, covering said lines of cut material with a flexible material capable of acting as a hinge, and thereafter cutting lines of severance in predetermined relation to said previously formed lines of cut, thereby forming a blank having its free edges defined by said lines of severance and its articulated edges defined by said lines of fold.

3. A process of producing articulated cartons from non-scorable sheeting which comprises passing said sheeting through a cutting press and simultaneously forming both longitudinal and lateral cuts therein following predetermined lines of articulation in a carton body and without severing the parts of said body from said sheeting, some at least of said lines of cut extending less than the full length of said predetermined lines of articulation leaving portions to hold the parts together, covering said cuts with a flexible material capable of acting as a hinge, and thereafter again subjecting said sheeting to the action of a cutting press whereby to sever therefrom a carton body containing said predetermined lines of articulation.

4. A process of producing articulated carton blanks from non-scorable sheet material which comprises first forming lines of cut in said sheet material along predetermined lines of fold extending both longitudinally and laterally without severing parts from said sheet material, some at least of said lines of cut extending less than the full length of said predetermined lines of fold leaving portions to hold the parts together, covering said lines of cut with a flexible material capable of acting as a hinge, and thereafter cutting lines of severance in predetermined relation to said lines of fold whereby to produce a complete carton blank the free edges of which are formed by said lines of severance and all articulated edges of which are formed by said lines of fold.

5. A process of producing articulated cartons from non-scorable sheeting which comprises first severing said sheeting along proposed lines of articulation in a carton body, said lines of severence extending both longitudinally and laterally of said sheeting but not severing parts of the carton body therefrom, plying to said sheeting a flexible material capable of serving as a hinge whereby to convert the lines of severance into lines of hinged articulation, and thereafter cutting additional lines of severance in predetermined relation to the previously formed lines of severance, said last mentioned lines of severance defining both the contour of said carton body and all internal lines of severance therein.

ROBERT MORRIS BERGSTEIN.

REFERENCES CITED

The following references are of record in the file of this patent:

UNITED STATES PATENTS

| Number | Name | Date |
| --- | --- | --- |
| 1,627,812 | Smith | May 10, 1927 |
| 2,116,828 | Gearson | May 10, 1938 |
| 2,233,207 | Gillam | Feb. 22, 1941 |
| 2,363,425 | Klein | Nov. 21, 1944 |